(12) United States Patent
Guerrero

(10) Patent No.: US 7,134,083 B1
(45) Date of Patent: Nov. 7, 2006

(54) METHOD AND SYSTEM FOR GENERATING BUTTON AND TAB USER INTERFACE CONTROL COMPONENTS WITHIN THE CONTEXT OF A HYPERTEXT MARKUP LANGUAGE (HTML) BASED WEB PAGE

(75) Inventor: Jaime F. Guerrero, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 695 days.

(21) Appl. No.: 10/198,217

(22) Filed: Jul. 17, 2002

(51) Int. Cl.
*G09G 5/00* (2006.01)

(52) U.S. Cl. ............ 715/760; 715/744; 715/840; 715/504; 715/837

(58) Field of Classification Search ........ 715/760, 715/744, 837, 840, 504
See application file for complete search history.

(56) References Cited

U.S. PATENT DOCUMENTS

| | | | | |
|---|---|---|---|---|
| 5,986,654 A | | 11/1999 | Alexander et al. ........ 345/349 |
| 6,065,024 A | * | 5/2000 | Renshaw ................ 715/513 |
| 6,683,649 B1 | * | 1/2004 | Anderson ............ 348/333.05 |
| 6,795,084 B1 | * | 9/2004 | Newman ................ 345/589 |

* cited by examiner

*Primary Examiner*—Ba Huynh
*Assistant Examiner*—Sara Hanne
(74) *Attorney, Agent, or Firm*—Osha * Liang LLP

(57) ABSTRACT

A method and system for web based control components. Specifically, the present invention describes a method of rendering user interface button and tab control components within a hypertext markup language (HTML) web page. The present invention generates an HTML table that comprises a plurality of cells. For a button component a two row by three column table is generated. For a tab component a five column table is generated. The present invention places a plurality of graphical corner images in the plurality of cells to produce corner outlines of the button or tab control component. Multiple button or tab components can be coupled together in a single table by repeatedly adding more of the plurality of cells associated with button or tab components, respectively. In addition, the control component has the ability to accommodate word wrapping of the text contained within the control component.

18 Claims, 14 Drawing Sheets

METHOD AND SYSTEM FOR GENERATING BUTTON AND TAB USER INTERFACE CONTROL COMPONENTS WITHIN THE CONTEXT OF A HYPERTEXT MARKUP LANGUAGE (HTML) BASED WEB PAGE

BACKGROUND OF THE INVENTION

1. Field of the Invention

Embodiments of the present invention relate to the field of web based control components. More particularly, embodiments of the present invention relate to button and tab control components for display within the context of a hypertext markup language based web page.

2. Related Art

Network environments allow a worldwide collection of networks (e.g., the Internet) and users on those networks to communicate with each other. Users accessing the Internet through a web browser can access and interact with content from web sites that are located on the Internet. Web sites located on the Internet comprise a group of related documents, associated files, script routines, and databases. A server manages and controls the websites that are associated with the server to present content within the websites to the accessing users.

The standardized Hypertext Markup Language (HTML) can be used for creating documents that are supported by various platforms (operating system and web browser) on the Internet. The HTML uses tags to mark elements (e.g., text and graphics) in a document to indicate how a web browser should display those elements. As such, a web page coded in HTML will generally be presented to a user similarly across various platforms.

In addition, HTML tags indicate how components within the web page should respond to actions by a user (e.g., mouse clicks). User interactions with components in a web page across the various platforms will generally have the same effect. Within the context of an HTML web page, user interface control components can be implemented for interaction between the web page and content within the web page. The control components are also known as widgets in some circles. Standard button and tab control components based in HTML can be implemented within the HTML web page for user interaction. For example, button control components can contain text for requesting an action, such as, "OK," "CANCEL," "SAVE," etc. Tab control components can contain text that when selected requests an associated page or window to be displayed. The text contained within the button or tab control component may be comprised of multiple words, e.g., "Save All Changes."

It can be desired that web pages be designed to have a particular style and format. A web page that is designed to have the same alignment and display presentation can be especially powerful for marketing purposes. For example, by preserving the presentation and format of its company web page across the various platforms that access and support the Internet, name brand recognition can be reinforced as users are presented with web pages that are consistent in presentation across whatever platform the user implements to access the Internet.

Unfortunately, within the context of HTML, button and tab components are affected by localization into foreign languages and user preferences. Localization of a web page involves altering the web page so that it is appropriate for use within a different country. In one case, this involves translating action text associated with a button or tab component. Depending on which language is used, the button or tab component may grow or shrink in size throwing off the alignment of graphics, text, and components within a web page. An action text translated from English may be increased to contain more words. As such, an HTML button or tab would increase in the horizontal direction to accommodate the increase in the number of words. As a result, horizontal scroll bars may be presented since the web page may be extended further in the horizontal direction.

Similarly, an HTML button or tab component may occupy more space in the vertical direction if the action text is translated to a language using characters or symbols for words (e.g., Chinese characters). Buttons or tabs that are in a line across a web page may come out of alignment, as some of the component may require translation and others not. In that case, components that are translated to characters may be taller vertically, and components that are not translated would not become taller, thereby throwing off vertical alignment.

Furthermore, user preferences for text size also will affect alignment and size of components within a web page. Button and tab components will extend in the horizontal and vertical directions to accommodate for increased size of text within a button or tab component. While web pages written in HTML will alter and flow the content to accommodate for increased size, page resizing is not generally performed. A component with text that has increased font size will increase in the vertical direction to accommodate for the increased size. This may be the case even though the web page may have empty space in the vertical direction. In that case, horizontal and vertical scroll bars would be presented prematurely to accommodate for the increased size of the component.

Similarly, it may be desired to have a web page that interacts with users in a similar fashion across the various platforms that support the Internet. In this way, users that are familiar with how to interact with components within a web page can interact with the same components in a consistent manner across the various platforms. There is no need to relearn what each component is supposed to do just because it is presented differently. As such, interactive consistency can help a web page distinguish its services from other web pages.

One approach in the prior art describes a display button for a web page integrating both a graphic pictorial image with character based textual information (with link) into a single iconic button in U.S. Pat. No. 5,986,654, "System and Method for Rendering On-Screen Iconic Buttons with Dynamic Textual Link," to Alexander. The display button is preferably represented in a table structure within HTML. The table structure contains two end cells which display graphic images therein. In between the end cells is inserted a display region displaying character based text. Also, thin horizontal row cells are colored to match the end cells and to create an outer boundary or edge image to help render a three-dimensional push button. Multiple upper display regions form the top of the push button and multiple lower display regions form the bottom push button. The text display region is surrounded by the end cells and the upper and lower display regions.

A problem with the Alexander patent is illustrated in Prior Art FIGS. 11A and 11B. While the upper and lower display regions and the text display region automatically expand or contract to accommodate the size of the textual link placed within the text region, the graphical images in the end cells are unable to accommodate for the stretching and contraction. Prior Art FIG. 11A is a diagram of a push button 1100 with one line of text 1110 within the text display region 1115.

The graphical images within the two end cells form the curved right 1130 and left 1120 sides of the push button 1100.

Unfortunately, when the push button 1100 of Prior Art FIG. 11A expands, the graphical images that form the right 1130 and left 1120 curves within the two end cells are unable to accommodate for the expansion. Prior Art FIG. 11B illustrates the problem associated with displaying the graphical images within the end cells when the text display region has expanded. The push button 1100 has expanded to include two lines of text 1140 and 1150. However, the rounded half circles 1120 and 1130 representing the ends of the button remain the same size as in Prior Art FIG. 11A. The rounded half circles 1120 and 1130 as graphical images are unable to expand to accommodate for the expansion of the display region, the horizontal upper region, and the lower display region, without adding new graphical images. As such, the two ends are no longer completely rounded. The left side includes lines 1125A and 1125B to accommodate for the expansion within the display and horizontal upper and lower display regions. Also, the right side includes lines 1135A and 1135B to accommodate for the expansion.

Moreover, within the context of HTML, standard button components are not presented consistently across the various platforms that support access to the Internet. The operating system and web browser that is used to access the Internet will determine how a button or tab component will be presented. For example, the shape of the particular component will vary across the various platforms. A button presented on an Apple Macintosh platform will not look the same as a button presented on a Microsoft Windows platform. Similarly, the colors of a particular component will be determined by the platform being used to access the Internet.

SUMMARY OF THE INVENTION

Embodiments of the present invention disclose a method and system for web based control components that are uniform across various user operating system and browser platforms. Embodiments of the present invention provide for web based control components that maintain page alignment in the vertical and horizontal directions through localization processes. In addition, embodiments of the present invention provide for page resizing when accommodating for increased sizes of button and tab component due to word wrapping and increased font sizing.

Specifically, one embodiment of the present invention describes a button control component that is implemented within a hypertext markup language (HTML) web page, in one embodiment. The button control component substitutes for an HTML button control component. The button control component is comprised of a two row by three column table including four corner cells and a middle 2-row-spanning cell. Four corner graphical images are placed in the four corner cells to effect a rounded corner appearance in the button component.

Another embodiment of the present invention also describes a tab control component that is implemented within an HTML web page, in one embodiment. The tab control component substitutes an HTML tab control component. The tab control component is comprised of a five column table that includes a left tail cell, a left corner cell to the right of the left tail cell, a middle cell to the right of the left corner cell, a right corner cell to the right of the middle cell, and a right tail cell to the right of the right corner cell. Two corner graphical images are placed in the left and right corner cells to effect a rounded top corner appearance in the tab component. Two tail graphical images are placed in the two tail cells to effect a tailed bottom corner appearance in the tab component.

In both the button and tab control components, the middle cell contains text that when selected invokes a hyperlink, in one embodiment. The middle cell allows word wrapping the text, and the associated cells accompanying the middle cell align themselves to accommodate any word wrapping of text. As such, under these conditions, the control components can maintain the placement and alignment of graphics and thus maintain proper visual effect.

In another embodiment, the present invention describes a method of rendering user interface button and tab control components within a hypertext markup language (HTML) web page. The present invention generates an HTML table that comprises a plurality of cells. For a button component a two row by three column table is generated. For a tab component a one row by five column table is generated. The present invention places a plurality of graphical corner images in the plurality of cells to produce corner outlines of the button or tab control component. Multiple button or tab components can be coupled together in a single table by repeating the cell configurations for each of the individual buttons or tabs, respectively. In addition, the control component can word wrap text contained within the button or tab control component.

BRIEF DESCRIPTION OF THE DRAWINGS

Prior Art

Prior Art

DETAILED DESCRIPTION OF THE INVENTION

Figure 1:
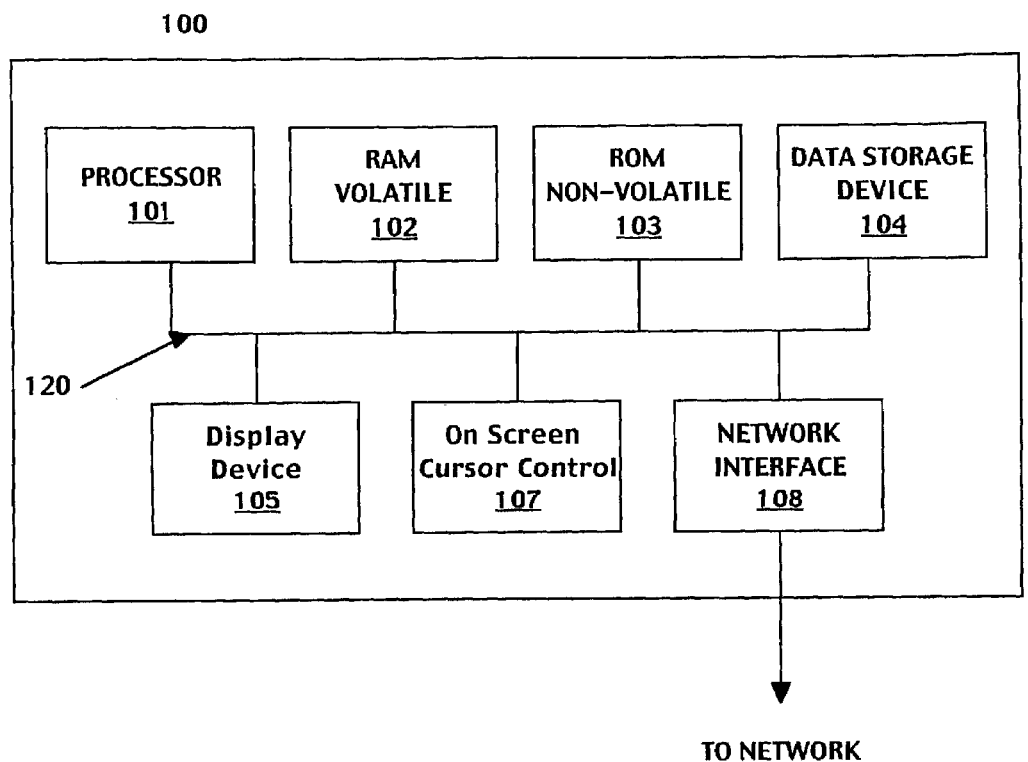
FIG. 1 is a logical block diagram of an exemplary computer system capable of displaying a user interface (UI) control component, in accordance with an embodiment of the present invention.

Reference will now be made in detail to the preferred embodiments of the present invention, a method and system for web based control components, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "displaying," "generating," "placing," "aligning," "invoking," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Referring to FIG. 1, embodiments of the present invention are comprised of computer-readable and computer-executable instructions which reside, for example, in computer-readable media of a computer system, such as those accessible by a user for accessing the Internet through a web browser. FIG. 1 is a block diagram of exemplary embedded components of an electronic system, such as, computer system 100, upon which embodiments of the present invention may be implemented.

Exemplary computer system 100 includes an internal address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary computer system 100 also includes an optional data storage device 104 (e.g., memory card, hard drive, etc.) coupled with the bus 120 for storing information and instructions. Data storage device 104 can be removable. As described above, exemplary computer system 100 also contains an electronic display device 105 coupled to the bus 120 for displaying information to the computer user.

System 100 also includes an optional cursor control or directing device 107 coupled to the bus 120 for communicating user input information and command selections to the central processor 101.

With reference still to FIG. 1, an optional signal Input/Output (I/O) device 108, that is a network interface, is shown. The I/O device 108 is coupled to bus 120 for providing a communication link between the computer system 100 and other electronic devices. As such, signal I/O device 108 enables the central processor unit 101 to communicate with or monitor other electronic systems that are coupled to the computer system 100, possibly through a network (e.g., the Internet).

Rendering Graphical User Interface Control Components

This disclosure describes a method and system for rendering a user interface (UI) control component in a web page environment. Embodiments of the present invention provide for web based control components that are uniform across various user operating system and browser platforms. Embodiments of the present invention provide for web based control components that maintain page alignment in the vertical and horizontal directions through localization processes. In addition, embodiments of the present invention provide for page resizing when accommodating for increased sizes of button and tab components due to word wrapping and increased font sizing.

The present invention is discussed within the context of control components, otherwise known as widgets to some well versed in the art. A control component is a portion of a user interface screen that is used, by a user, to perform some action on a screen, such as, a web page. A control component is unique from content, which is typically text and graphics. Content generally can only be read or viewed and not manipulated. Control components, on the other hand, can be read and manipulated (e.g., "Delete"). A control component can be built and presented in a standard fashion and can appear many times on a web page. The control components look and behave similarly, except for unique aspects of each control component, such as, its label or list of choices.

Figure 2:
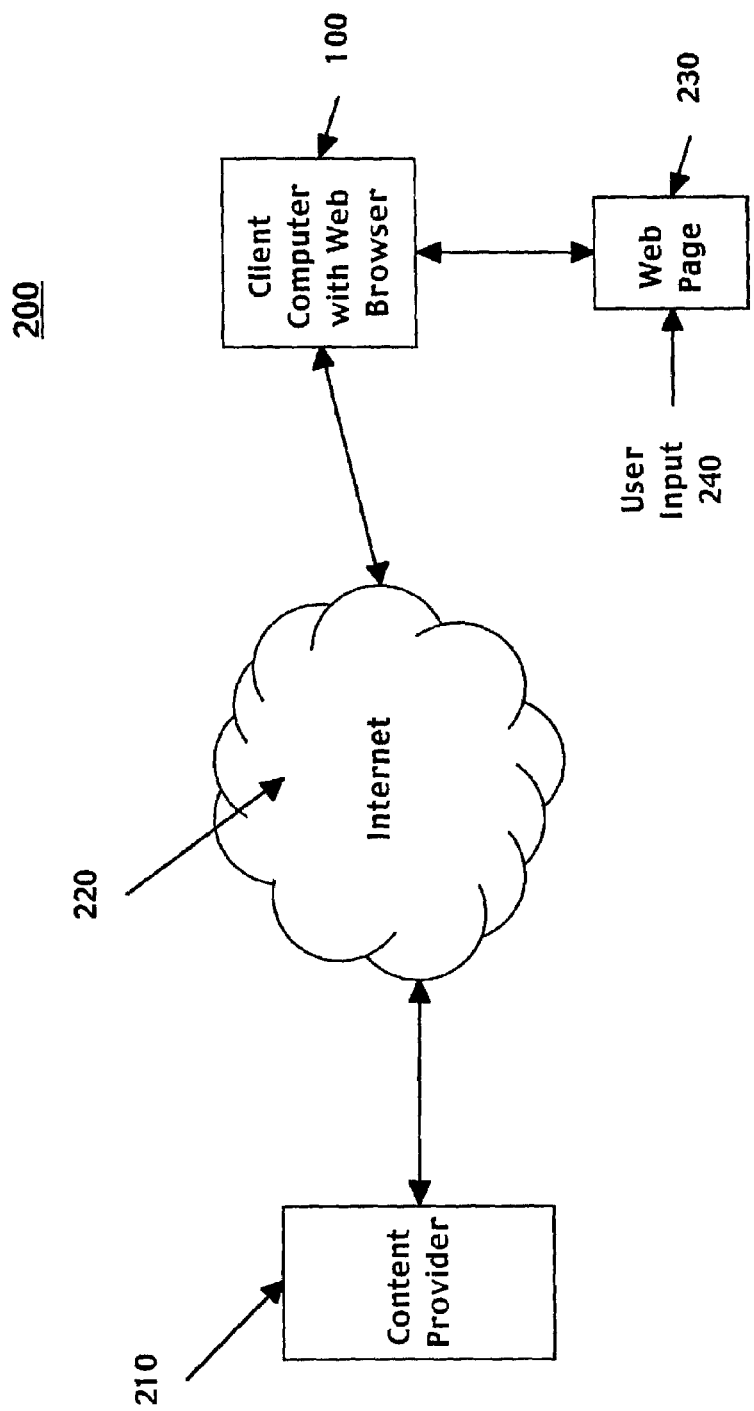
FIG. 2 is a block diagram of an exemplary communication system implementing the display of UI control components within the context of a hypertext markup language (HTML) web page environment, in accordance with one embodiment of the present invention.

FIG. 2 depicts an exemplary communication system 200 capable of implementing UI control components within a hypertext markup language (HTML) web based environment, in accordance with one embodiment of the present invention. In system 200 a content provider 210 (e.g., a server computer) provides information, such as an HTML document, for viewing or distribution over a network 220 (e.g., Internet). A client computer 100 with a web browser accesses the network 220 for requesting the information from the content provider 210.

In one embodiment, a web page 230 is requested by the client computer 100 from the content provider 210. The web page supplied by the content provider 210 contains UI control components in the form of buttons and tabs. The button and tab control components respond to user input 240, such as, clicks, etc.

Figure 3:
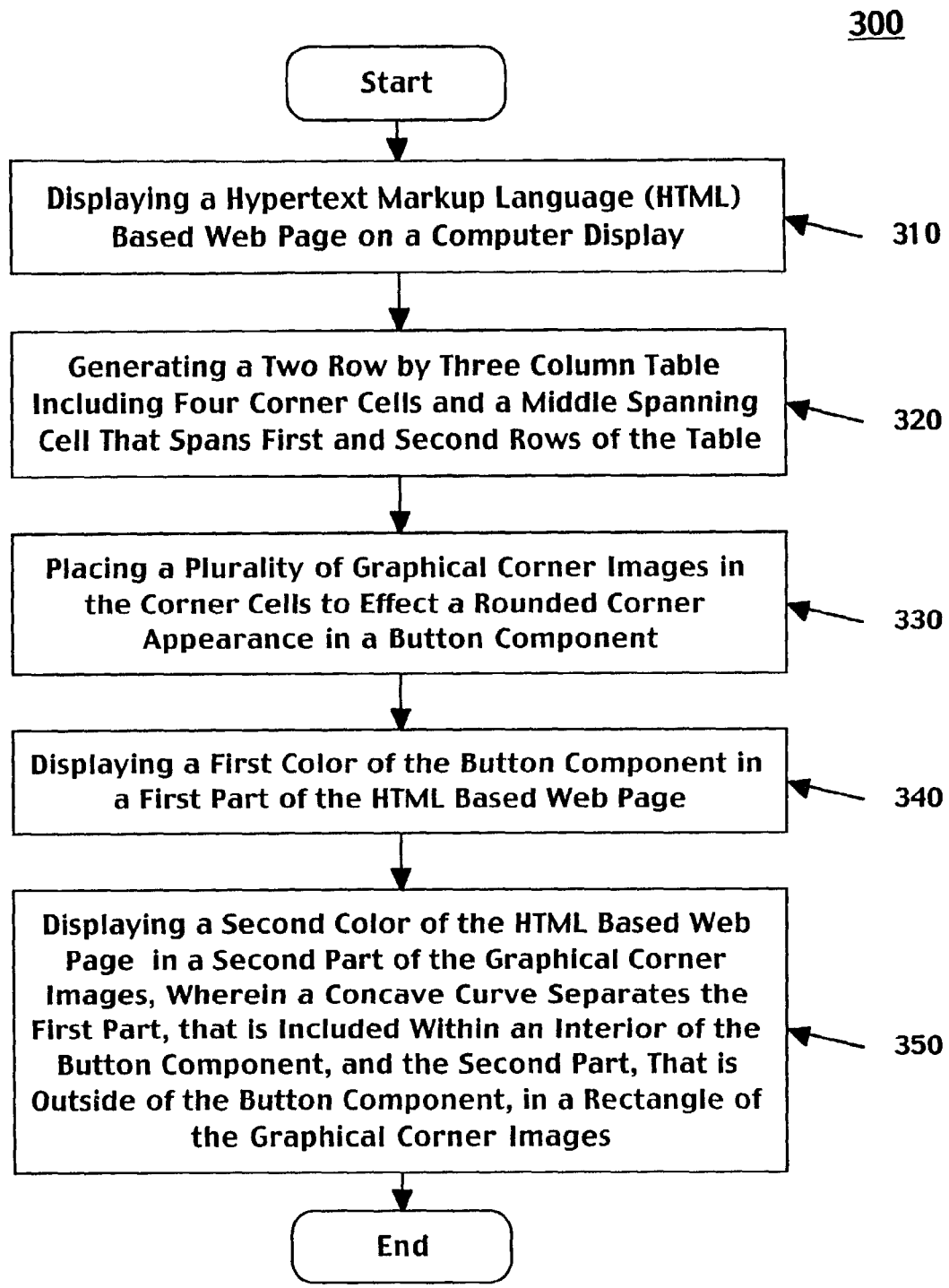
FIG. 3 is a flow chart illustrating steps in a method for displaying UI button control components on a web page, in accordance with one embodiment of the present invention.

FIG. 3 is a flow chart 300 illustrating steps in a computer implemented method of rendering UI button control components within a web based environment, in accordance with one embodiment of the present invention. The present embodiment begins by displaying an HTML based web page on a computer display. The web page can be the web page 230 that is requested by a user of the client computer 100. The web page contains at least one button component comprised of a table and graphic images as described in embodiments of the present invention. In one embodiment, the table is an HTML table.

Figure 4:
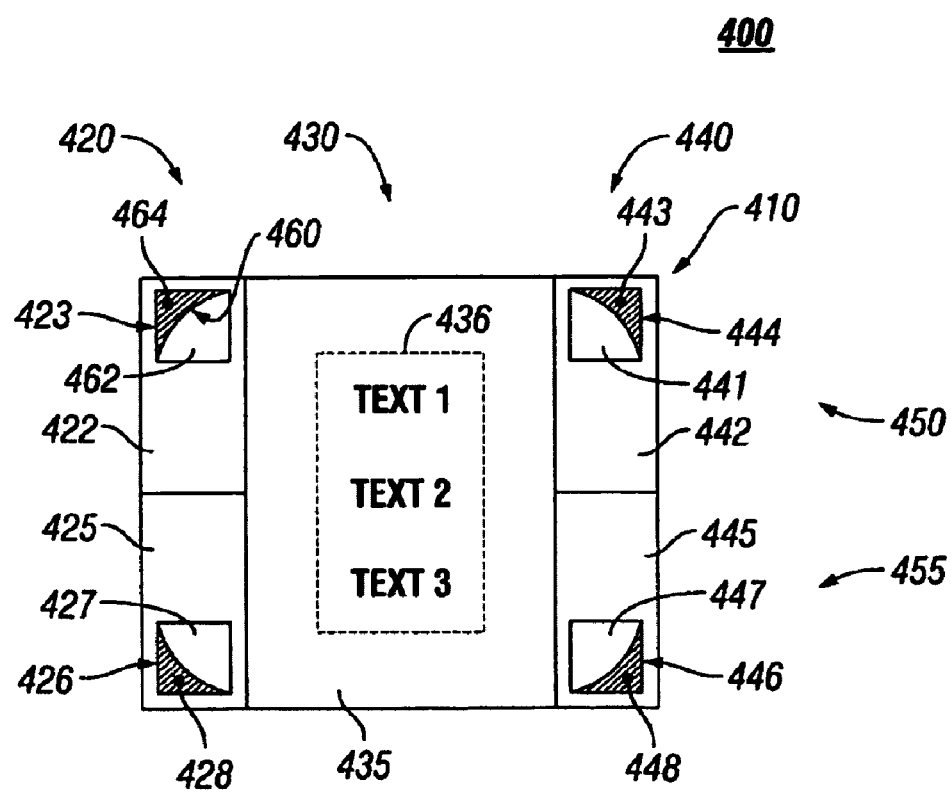
FIG. 4 is a diagram illustrating a button control component with graphical corner images in a two row by three column table, in accordance with one embodiment of the present invention.

In step 320, a two row by three column table is generated. FIG. 4 is a diagram illustrating a button component 400 comprising the two rows (450 and 455) by three column (420, 430, and 440) table 410. The table 410 comprises five cells: four corner cells and a middle cell that spans two rows. From left to right, a first column 420 includes an upper left corner cell 422 and a lower left corner cell 425. The second column 430 contains a middle spanning cell 435. A third column 440 includes an upper right corner cell 442 and a lower right corner cell 445.

The table 410 contains two rows. A first row 450 includes the upper left corner cell 422, the middle spanning cell 435 and the upper right corner cell 442. A second row 455 includes the lower left corner cell 425 and the lower right corner cell 445. The middle spanning cell spans both the first 450 and second 455 rows.

Referring back to flow chart 300 in FIG. 3, in step 330 a plurality of graphical corner images are placed in the corner cells to effect a rounded corner appearance in the button component 400. The plurality of graphical corner images are illustrated in FIG. 4 as corner images 423, 426, 444, and 446. The graphical corner image 423 is placed within and aligned to the top of the upper left corner cell 422. The graphical corner image 444 is placed within and aligned to the top of the upper right corner cell 442. The graphical corner image 426 is placed within and aligned to the bottom of the lower left corner cell 425. The graphical corner image 446 is placed within and aligned to the bottom of the lower right corner cell 445.

Each of the graphical corner images 423, 426, 444 and 446 is comprised of a rectangle that includes a curve whose middle portion is rounded outward, away from the center of the button component. The curve separates a first part that is perceived as included within the interior of the button component and a second part that is perceived as outside of the interior of the button component. The interior is defined by an outline of the button component that is created by the cells within the table 410 and the graphical corner images 423, 426, 444, and 446. For example, the interior includes the entire middle spanning cell 435.

For example, graphical image 423 includes a curve 460 that defines a first part 462 and a second part 464. The middle portion of curve 460 is rounded outward, away from the perceived interior (e.g., the middle spanning cell 435) of the button component 400. The first part 462 is designed to display the color of the button component 400, as described in step 340. In one embodiment, each of the cells in the table 410 displays, as a background, the color of the button component 400. As such, the first part 462 can be designed to be transparent, in order to let the color of the button component 400 in the upper left corner cell 422 of the table 410 to show through. For purposes of explanation, FIG. 4 shows the background color of the button component 400 to be white; however, background colors of the button component can be selected to be any color. The second part 464 is designed to display the color of the HTML web page background, as described in step 350.

Continuing through each of the corner cells in the table 410, the upper right corner cell 442 is comprised of a graphical corner image 444. The corner image 444 is comprised of a first part 441 that is perceived as included within the interior of the button component 400, and a second part 443 that is perceived as outside of the interior of the button component 400. Similarly, the lower right corner cell 445 is comprised of a graphical corner image 446. The corner image 446 is comprised of a first part 447 that is perceived as included within the interior of the button component 400, and a second part 448 that is perceived as outside of the interior of the button component 400. Lastly, the lower left corner cell 425 is comprised of a graphical corner image 426. The corner image 426 is comprised of a first part 427 that is perceived as included within the interior of the button component 400, and a second part 428 that is perceived as outside of the interior of the button component 400.

For display, each of the first parts 462, 441, 447, and 427 are designed to display the color of the button component 400, as described in step 340. As discussed earlier, the first parts 462, 441, 447, and 427 can be transparent to let the color of each of the cells in the table 400 show through. Correspondingly, each of the second parts 464, 443, 448, and 428 are designed to display the color of the HTML web page background, as described in step 350 of flow chart 300.

Figure 12A:
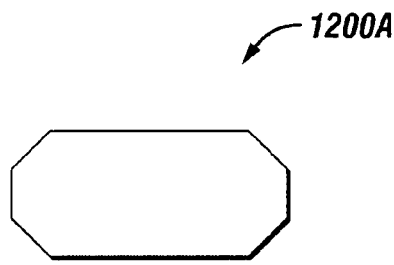
FIG. 12A is diagram illustrating a button control component with graphical corner images that are sharp, in accordance with one embodiment of the present invention.
Figure 12B:
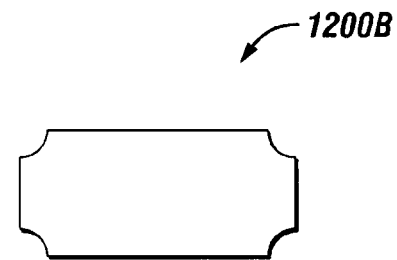
FIG. 12B is diagram illustrating a button control component with graphical corner images that are inversely curved, in accordance with one embodiment of the present invention.

Moreover, the graphical images effecting the corners of the button component 400 can be of any varying shape. For example, FIGS. 12A and 12B give two of many examples of a two row by three column button component with varying corner shapes. FIG. 12A illustrates a button component 1200A with sharp corner edges. FIG. 12B illustrates a button component 1200B with inversely rounded corners. These graphical images effecting the corners in button components 1200A and 1200B can be implemented within step 330 of FIG. 3.

Returning to FIG. 4, the middle spanning cell 435 contains text 436 that is a label for the button component 400. As shown in FIG. 4, the text 436 contains three words: text 1, text 2, and text 3. The table 410 can force the text contained within the middle spanning cell 435 to word wrap to accommodate layout constraints on the page; this behavior facilitates easier localization, accessibility, and adaptability to various screen sizes, in accordance with one embodiment. For example, when translating the text 436 into a foreign language, if the translated text is longer, the text 436 may adapt to fit by word wrapping the words within the text 436 within the button component 400, rather than extend the translated text 436 in the horizontal direction, as in HTML based button components. This adaptation is a natural and automatic part of web page layout, and as such, this invention takes advantage of this adaptation.

One benefit to using a table 410 to build the button component 400 is the ability for the table to align the cells within the table 410 to accommodate for increasing or decreasing sizes of the cells, in accordance with one embodiment. For example, when the text 436 begins to word wrap, causing the middle spanning cell 435 to increase in size, the accompanying corner cells 422, 442, 445, and 425 will also increase in size to maintain the alignment of the cells within the table 410. As such, when the middle spanning cell increases in height, the entire button component 400 also correspondingly increases in height. When the middle spanning cell decreases in height, the entire button component 400 also correspondingly decreases in height.

In another embodiment, a hyperlink is invoked whenever the text 436 is selected, e.g., by clicking. For example, the hyperlink loads another web page or executes a script routine. As such, actions can be taken when the button component 400 is selected (e.g., "Delete File," etc.).

In still another embodiment, the cells within the table 410 are presented without borders, without spacing between the cells, and no cell padding. This is to aid in defining and enclosing the button component 400.

Figure 5:
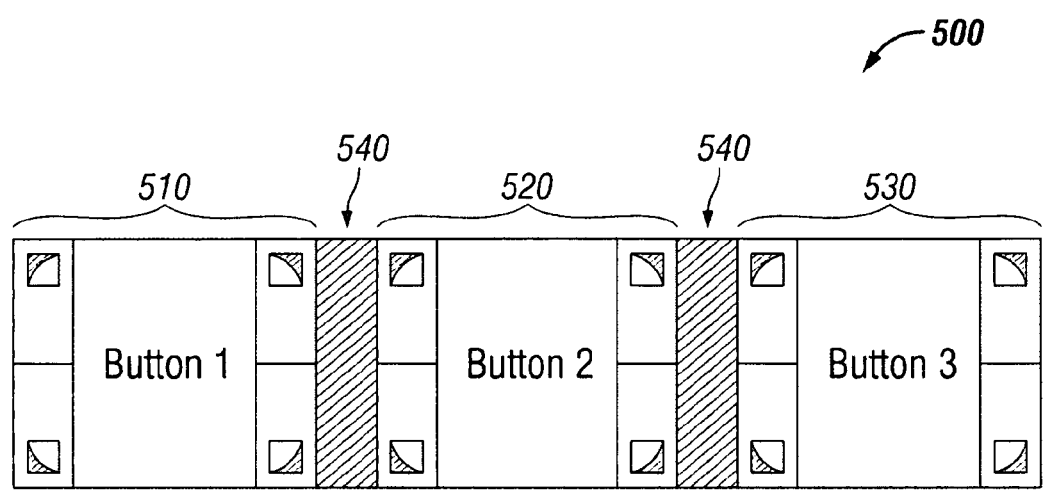
FIG. 5 is a diagram illustrating N button control components with graphical corner images in a single 2 row by [(3×N)+(N−1)] column table, in accordance with one embodiment of the present invention.

FIG. 5 is a diagram illustrating a table 500 containing multiple button components, in this example, three. Table 500 can contain N button components, where N=3. Each of the button components comprises three columns of the table. Table 500 is comprised of two rows by [(3×N)+(N−1)]=11 columns to accommodate for the three columns in each of the N components, and for a spacing element between each of the N button components. FIG. 5 illustrates N=3 button components in a table 500: the first button component 510, the second button component 520, and the third button component 530. Spacer cells or elements 540 and 550 are placed between each of the button components for visible separation of the button components 510, 520, and 530. The spacer cells can be designed to display the color of the web page background, in one embodiment.

As described earlier, one of the benefits of using a single table for displaying multiple button components is the alignment of cells within the table 500 when one of the cells expands or contracts, in accordance with one embodiment. For example, when the text in one button component begins to word wrap within the middle spanning cell to increase in size, the accompanying corner cells will also increase in size to maintain the alignment of the cells within the table 500. Also, the accompanying cells for the remaining button components in the table 500 will also increase in size to accommodate for the increase in size of the middle spanning cell due to word wrapping. As such, when a middle spanning cell of one of the button components in a table 500 increases, the entire table 500 (e.g., all the button components) also correspondingly increases.

Figure 6A:
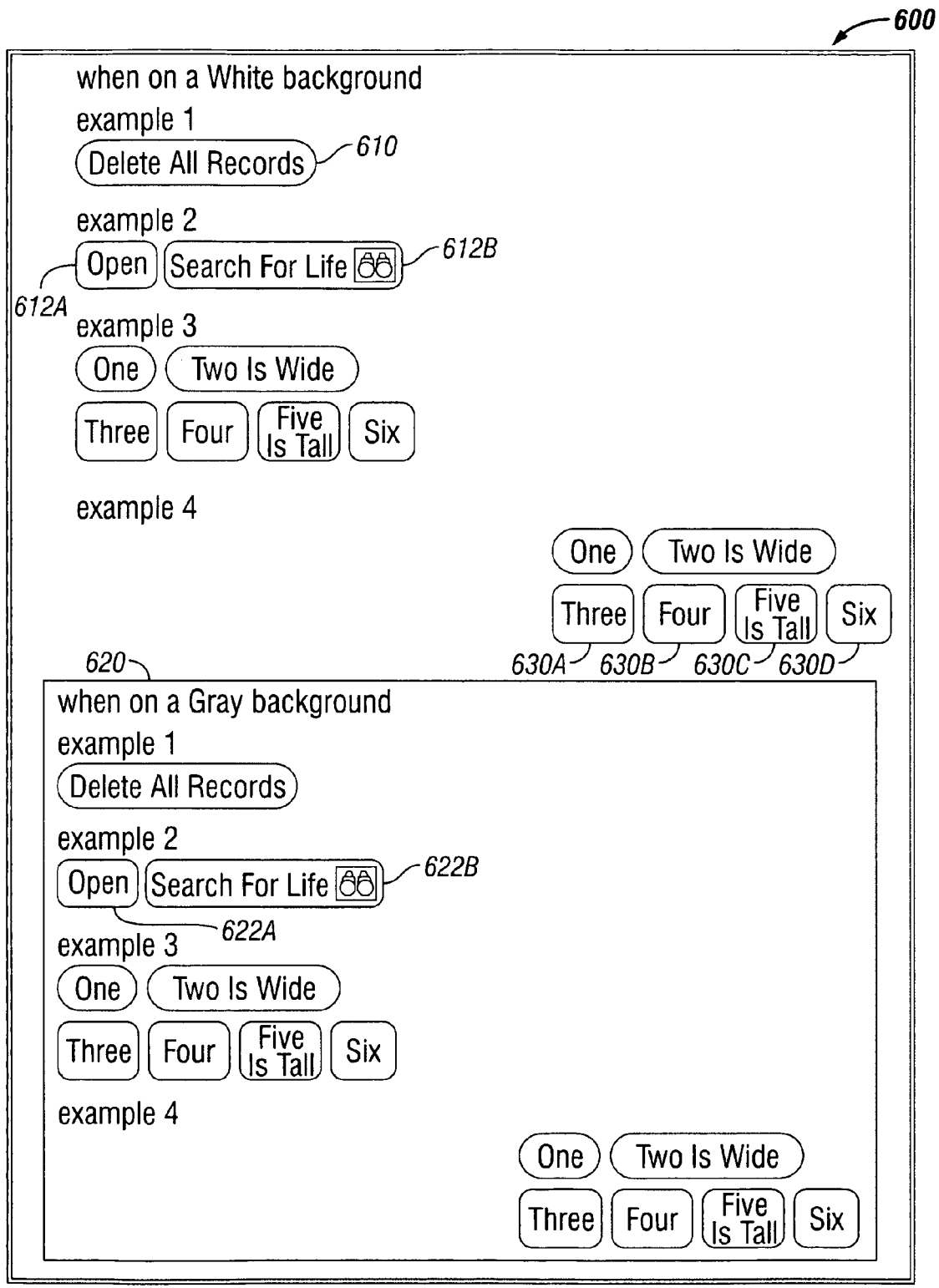
FIG. 6A is a diagram of a web page illustrating button components with word wrapping capability, in accordance with one embodiment of the present invention.

FIG. 6A is a diagram illustrating the use of button components comprised of HTML tables and graphical images to define the corners. The button components in FIG. 6A are presented both over a white background and a gray background on a display to show that various color schemes are possible for use with embodiments of the present invention. The white and gray backgrounds can be examples of background colors for a web page 600 that incorporates button and tab components of the present invention. For example, button components 612A and 612B are presented over a white background. Similar button components 622A and 622B in window 620 are presented over a gray background.

FIG. 6A illustrates the alignment of button components to the right and left sides of the viewing window displaying the web page 600. For example, button components 612A and 612B are aligned to the left of the viewing window displaying web page 600, and button components 630A–D are aligned to the right side of viewing window displaying web page 600. At this time the size of the window showing web page 600 is of sufficient size to accommodate all of the buttons within the example of web page 600.

Text within the button components of FIG. 6A are of a particular font and size. For example, the text within the button component 610, "Delete All Records," is of the same font and size of font as the text within the button components 612A, "Open," and 612B, "Search for Life." The button components 612A and 612B are included within a single table for horizontal and vertical alignment.

As discussed earlier, the cells within a button component and/or corresponding table will align themselves, both horizontally and height-wise, with each other. In FIG. 6A, the button components 612A and 612B are larger than the button component 610 even though the font and size of font are identical. The button components 612A and 612B are larger to accommodate for the larger graphical image (binoculars) included in the label of button component 612B. As such, all of the cells within the table incorporating 612A and 612B will increase their size in the vertical direction to match the cell containing the graphical image in button component 612B. In one embodiment, the graphical image (binoculars) is included within another column of the table.

Figure 6B:
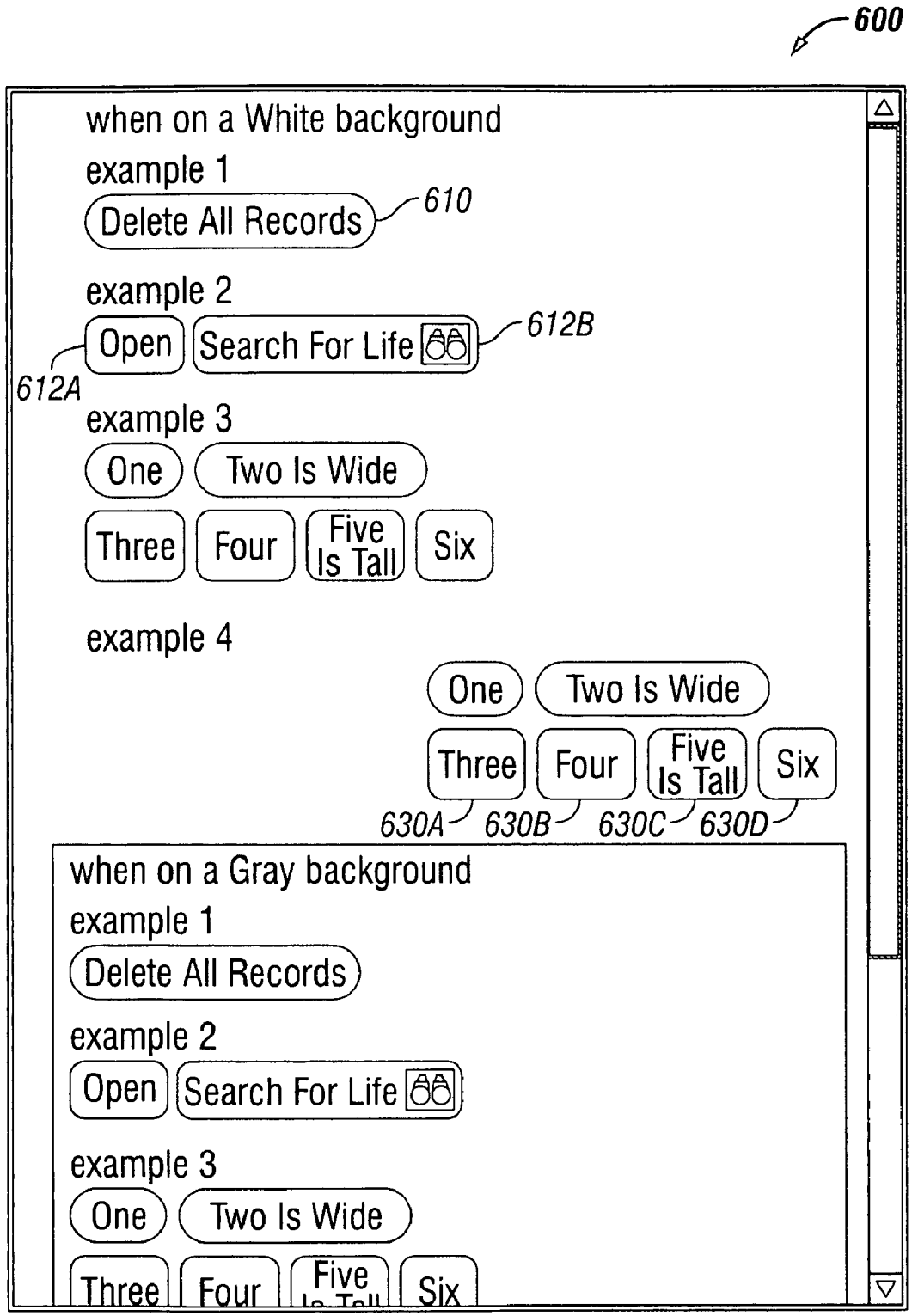
FIG. 6B is a diagram of the web page in FIG. 6A illustrating an increase in font size of text within button components and the preservation of horizontal and vertical alignment, in accordance with one embodiment of the present invention.

FIG. 6B illustrates the same web page 600, where, through user preference, the font size of the text within the button components in the web page 600 has been increased from the font size illustrated in FIG. 6A.

Alignment of the button components in the horizontal direction can be maintained by virtue of using HTML table based button components. For example, the table containing the button components 630A–D has maintained its alignment to the right side of the viewing window displaying the web page 600. All of the button components 630A–D are still visible. As such, the horizontal scroll bars remain unnecessary as the alignment of the button components has shifted to accommodate the change in viewing window sizing.

Alignment in the vertical direction is also generally maintained. However, because of the increase in font size, not all of the button components can be viewed within the viewing window of FIG. 6B. As such, vertical scroll bars are necessary to scroll up and down in the vertical direction.

The increase in font size of the text of the button components is also accommodated by embodiments of the present invention. As illustrated in FIG. 6B, the text within the button components of web page 600 can be user defined to a larger size. Button components will increase in size to accommodate the larger font size of the text within the button component. Additionally, button component 610 is now of the same vertical size as the button components 612A–B. The text within the button component 612B has increased and matched its size to the graphical image (binoculars) in 612B.

Figure 6C:
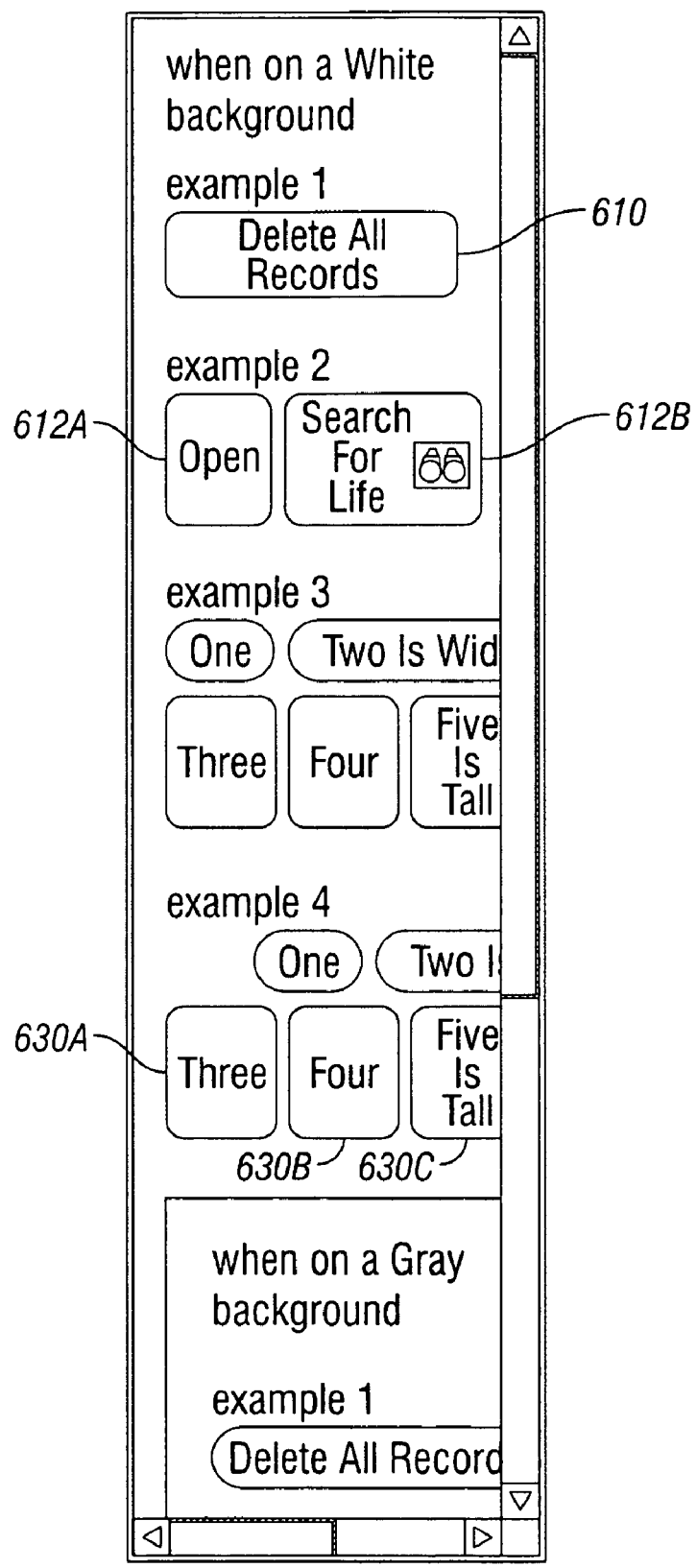
FIG. 6C is a diagram of the web page in FIG. 6A illustrating the horizontal shrinking of a web page and the accommodating word wrapping capability within the button components, in accordance with one embodiment of the present invention.

FIG. 6C illustrates the same web page 600 in an even smaller viewing window that has been further reduced in the horizontal direction from the illustration of FIG. 6B. The font size of the text within the button components in the web page 600 has remained the same as illustrated in FIG. 6B.

Alignment of the button components in the horizontal and vertical directions occurs to accommodate for the change in page size. In the horizontal direction, the button components continue to be aligned to the right and left sides of the viewing window displaying the web page 600. For example, the button components 630A–D are aligned to the right side of the viewing window displaying the web page 600, and is pushed all the way to the left side of the viewing window. Not all of the button components in the table containing button components 630A–D are visible, thereby necessitating the use of the horizontal scroll bars to scroll to the left and right of the web page 600. However, with the use of the HTML table based components having alignment capabilities, the use of the horizontal scroll bars is delayed until the button components could not be pushed any further to the left side of the viewing window displaying the web page 600.

Furthermore, the button components can align themselves in the vertical direction by performing word wrapping of text within the button components, in accordance with one embodiment of the present invention. For example, in an effort to show most of the button components within the viewing window displaying the web page 600, the text will be word wrapped within corresponding button components. The text in the button component 610 has been word wrapped in order to display all of the button component 610 in the viewing window. The middle spacing cells 435 containing the text that has been word wrapped will also increase its size in the vertical direction to accommodate for the word wrapping. Additionally, associated cells in the button component and the table containing the button component that is word wrapped will also align themselves in the vertical direction to accommodate for the word wrapping.

In addition, the text within button component 612B has also been word wrapped to display all of the button component 612B. The corresponding button component 612A, contained within the same table including button components 612A–B, will also increase in size in the vertical direction to align itself with the vertical increase in button component 612B due to word wrapping. Similarly, the text within the button component 630C is word wrapped to display all of the button component 630C. As such, the corresponding button components 630A, 630B, and 630D will also increase their vertical size to align themselves with the increase in size of the button component 630C, since they are all contained within the same table.

Figure 7:
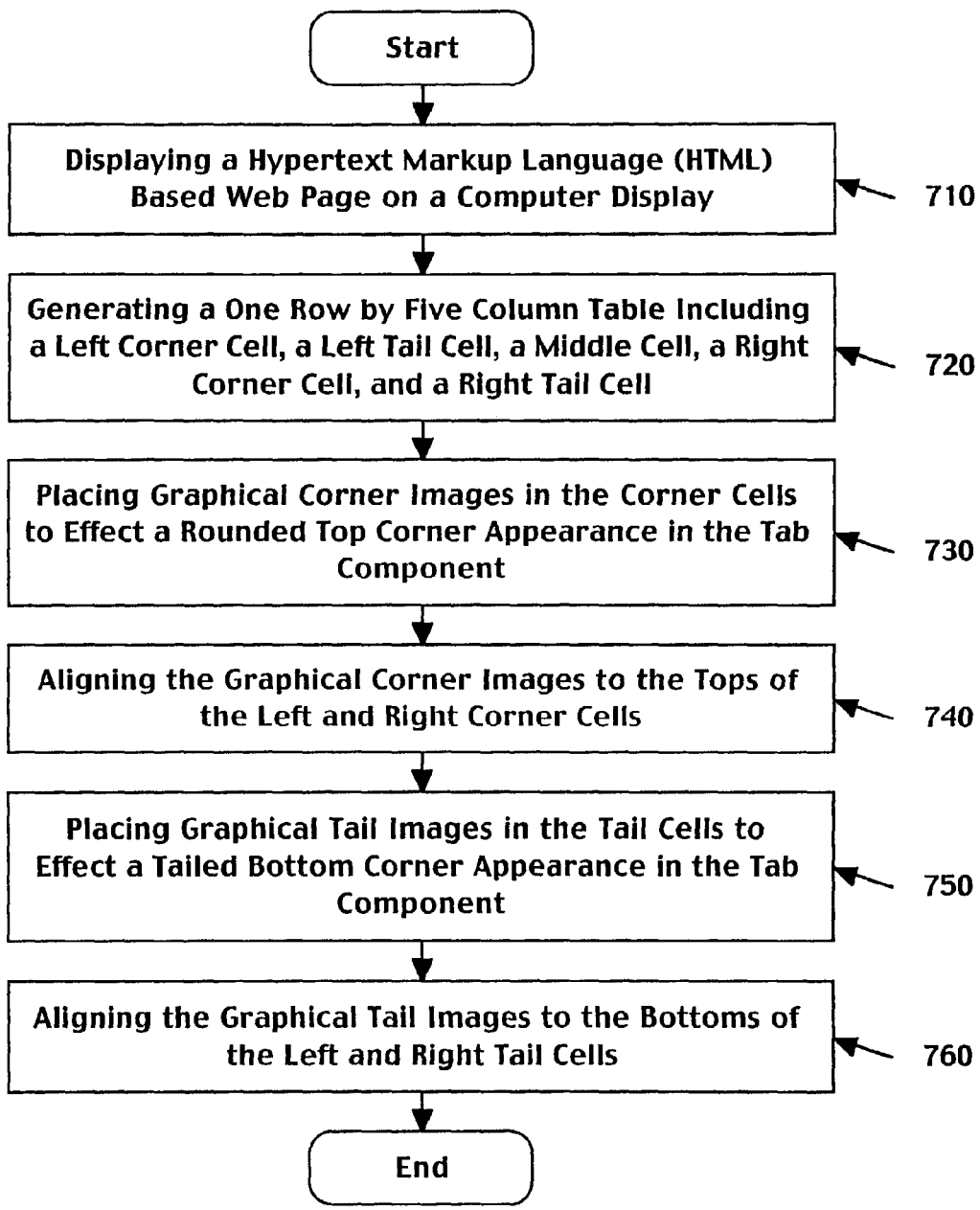
FIG. 7 is a flow chart illustrating steps in a method for displaying UI tab control components on a web page, in accordance with one embodiment of the present invention.

FIG. 7 is a flow chart 700 illustrating steps in a computer implemented method for rendering user interface (UI) tab control components within a web based environment, in accordance with one embodiment of the present invention. The present embodiment begins by displaying an HTML based web page on a computer display. The web page can be the web page 230 that is requested by a user of the client computer 100. The web page contains at least one tab component comprised of an HTML based table and graphical images for defining the corners of the tab component, as described in embodiments of the present invention.

Figure 8:
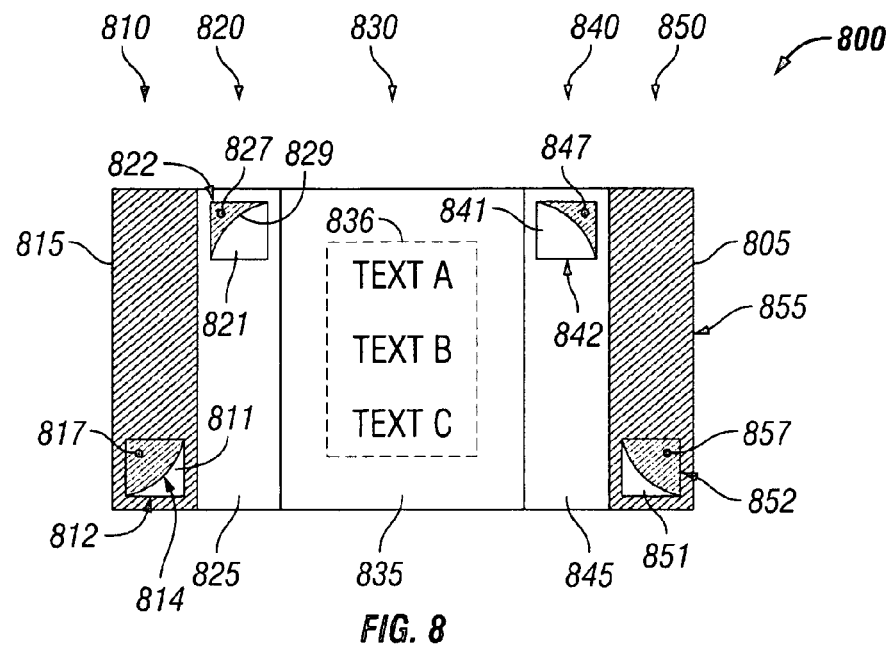
FIG. 8 is a diagram illustrating a tab control component with graphical corner images and graphical tail images in a one row by five column table, in accordance with one embodiment of the present invention.

In step 720, a one row by five column table 805 is generated. FIG. 8 is a diagram illustrating a tab component 800 comprising the one row by five column (810, 820, 830, 840, and 850) table. The table 805 comprises five cells, one cell per column, as follows: a left tail cell 815 in column 810; a left corner cell 825, in column 820, to the right of the left tail cell 815; a middle cell 835, in column 830, to the right of the left corner cell 825; a right corner cell 845, in column 840, to the right of the middle cell 835, and a right tail cell 855, in column 850, to the right of the right corner cell 845.

In step 730, a plurality of graphical corner images are placed in the corner cells 825 and 845 to effect a rounded top corner appearance in the tab component 800. The plurality of graphical corner images are illustrated in FIG. 8 as corner images 822 and 842. The graphical corner image 822 is placed within and aligned to the top of the left corner cell 825. The graphical corner image 842 is placed within and aligned to the top of the right corner cell 845. Alignment of the graphical corner images 822 and 842 to the tops of the left and right corner cells 825 and 845, respectively, is performed in step 740.

Each of the graphical corner images 822 and 842 is comprised of a rectangle that includes a curve whose middle portion is rounded outward, away from the center of the tab component. The curve separates a first part that is included within the perceived interior of the tab component and a second part that is perceived as outside of the tab component. The perceived interior is defined by an outline of the tab component that is created by the cells within the table 805, the graphical corner images 822 and 842, as well as graphical tail images 812 and 852. For example, the perceived interior includes the entire middle cell 835.

For example, graphical image 822 includes a curve 829 that defines a first part 821 and a second part 827. The curve 829 is connected to two opposing corners of the rectangle defining the border of the graphical image 822. The first part 821 is designed to display the color of the tab component 800. In one embodiment, each of the cells in the table 805 displays, as a background, the color of the tab component 800. As such, the first part 821 can be designed to be transparent, in order to let the color of the tab component 800 in the left corner cell 825 of the table 805 to show through. For purposes of explanation, FIG. 8 shows the background color of the tab component 800 to be white; however, background colors of the tab component can be selected to be any color. The second part 827 is designed to display the color of the HTML web page background.

Similarly, the right corner cell 845 in the table 805 is comprised of a graphical corner image 842. The corner image 842 is comprised of a first part 841 that is included within the perceived interior of the tab component 800, and a second part 847 that is outside of the perceived interior of the tab component 800. As discussed previously, the first part 841 is designed to display the color of the tab component 800, and can be transparent, in order to let the background color of the right corner cell 845 (the tab component background color) to show through. The second part 847 is designed to display the color of the HTML web page background.

Returning back to flow chart 700, in step 750, a plurality of graphical tail images are placed in the tail cells 815 and 855 to effect a tailed bottom corner appearance in the tab component 800. The plurality of graphical tail images are illustrated in FIG. 8 as tail images 812 and 852. The graphical tail image 812 is placed within and aligned to the bottom of the left tail cell 815. The graphical tail image 852 is placed within and aligned to the bottom of the right tail cell 855. Alignment of the graphical tail images 812 and 852 to bottoms of the left and right tail cells 815 and 855, respectively, is performed in step 760.

Each of the graphical tail images 812 and 852 is comprised of a rectangle that includes a curve that separates a tail shaped part included within the perceived interior of the tab component 800 and a second part that is outside of the perceived interior. The perceived interior is defined by an outline of the tab component that is created by the cells 835, 825, and 845 within the table 805, the graphical corner images 822 and 842, as well as graphical tail images 812 and 852. For example, the perceived interior includes the entire middle cell 835.

For example, graphical image 812 includes a curve that defines a tail part 811 and a second part 817. The curve 814 is connected to two opposing corners of the rectangle defining the border of the graphical image 812. The tail shaped part 811 includes a side that touches the perceived interior of the tab component. The tail shaped part 811 tails away from the perceived interior to the corner of the component.

The tail shaped part 811 is designed to display the color of the tab component 800. In one embodiment, the cell 815 displays, as a background, the color of the HTML web page background. As such, the non-tail shaped part 817 can be designed to be transparent, in order to let the color of the page to show through.

In another embodiment, the cell 815 does not specify a background color, and so is effectively transparent, in order to let the color of the page show through.

Similarly, the cell 855 includes a graphical tail image 852 that is comprised of a tail shaped part 851 that is perceived as included within the interior of the tab component 800, and a second part 857 that is outside of the interior. As discussed previously, the tail shaped part 851 is designed to display the color of the tab component 800, and the second part 857 is designed to be transparent to display the color of the HTML web page background. In one embodiment, the cell 855 displays, as a background the color of the HTML web page background.

In another embodiment, the cell 855 does not specify a background color, and so is effectively transparent, in order to let the color of the page show through.

Figure 13A:
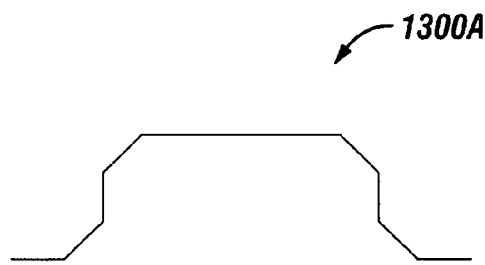
FIG. 13A is a diagram illustrating a tab control component with graphical corner images and graphical tail images that are sharp, in accordance with one embodiment of the present invention.
Figure 13B:
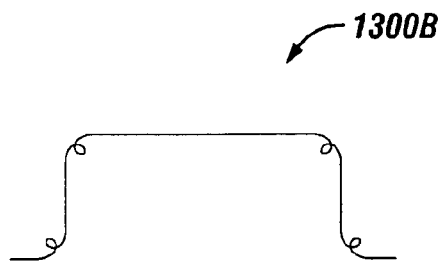
FIG. 13B is a diagram illustrating a tab control component with graphical corner images and graphical tail images that are in a curlyque shape, in accordance with one embodiment of the present invention.

Moreover, the graphical images effecting the corners and tails of the tab component 800 can be of any varying shape. For example, FIGS. 13A and 13B give two of many examples of a one row by five column tab component with varying corner and tail shapes. FIG. 13A illustrates a tab component 1300A with sharp corner and tail edges. FIG. 13B illustrates a tab component 1300B with curlyque corners and tails. These graphical images effecting the corners and tails in tab components 1300A and 1300B can be implemented within steps 730 and 750, respectively, of FIG. 7.

Returning to FIG. 8, the middle cell 835 contains text 836 that is a label for the tab component 800. As shown in FIG. 8, the text 836 contains three words: text A, text B, and text C. The table 805 can force the text contained within the middle cell to word wrap to accommodate layout constraints on the page; this behavior facilitates easier localization, accessibility, and adaptability to various screen sizes, in accordance with one embodiment. For example, when translating the text 836 into a foreign language, the text 836 will adapt, by word wrapping, to fit within the web page, as described previously for button components.

A benefit to using a table 805 to build the tab component 800 is the ability for the table 805 to align all its cells to accommodate for increasing or decreasing sizes due to word wrapping, localization to foreign languages, etc. For example, when the text 836 begins to word wrap within the middle cell 835 to increase its vertical size, the accompanying corner and tail cells 815, 825, 845, and 855 will also increase in size to maintain the alignment of the cells within the table 805. As such, when the middle cell increases, the entire tab component 800 also correspondingly increases. Similarly, when the middle cell 835 decreases, the entire tab component 800 also decreases. Previous discussions as to vertical and horizontal alignment for button components are equally applicable to tab components.

In one embodiment, a hyperlink is invoked whenever the text 836 is selected, e.g., by clicking. For example, the hyperlink loads another web page or executes a script routine. As such, actions can be taken when the tab component 800 is selected, such as bringing to the forefront the window associated with the tab component that is selected.

In still another embodiment, the cells within the table 805 are presented without borders, without spacing between the cells, and no cell padding. This is to aid in defining and enclosing the tab component 800.

Figure 9:
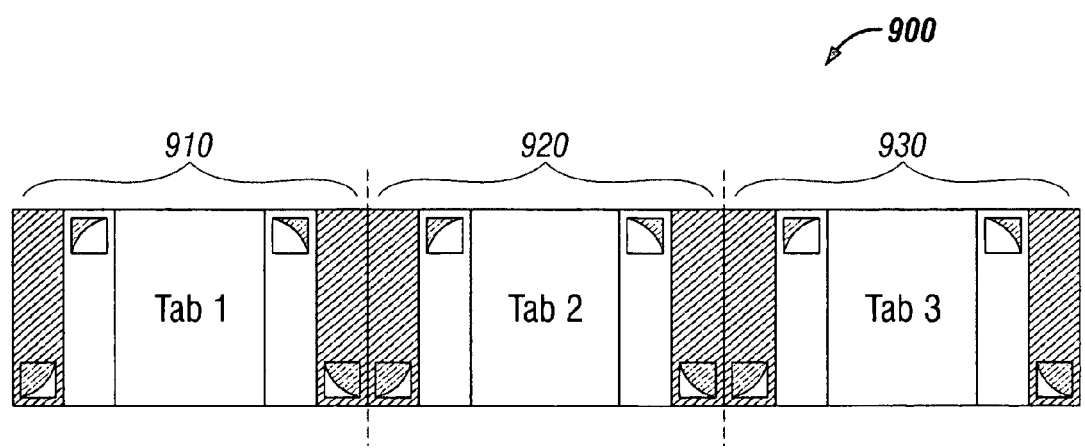
FIG. 9 is a diagram illustrating N tab control components with graphical corner and tail images in a single row by 5×N column table, in accordance with one embodiment of the present invention.

FIG. 9 is a diagram illustrating a table 900 containing multiple tab components, in this example, three. Table 900 can contain N tab components. Each of the tab components comprises five columns of the table 900. Table 900 is comprised of 5×N=15 columns to accommodate for the five cells in each of the N tab components. FIG. 9 illustrates N=3 tab components in a table 900: the first tab component 910, the second tab component 920, and the third tab component 930.

As described earlier, a benefit to using a single table for displaying multiple tab components is the alignment of cells within the table 900 when one of the cells expands or contracts, in accordance with one embodiment. For example, when the text in one button component begins to word wrap within the middle cell to increase in size, the accompanying tail and corner cells will also increase in size to maintain the alignment of the cells within the table 900.

Also, the accompanying cells for the remaining tab components in the table 900 will also increase in size to accommodate for the increase in size of the middle cell that has increased due to word wrapping. As such, when one tab component increases in size, all the tab components will also increase in size.

Figure 10A:
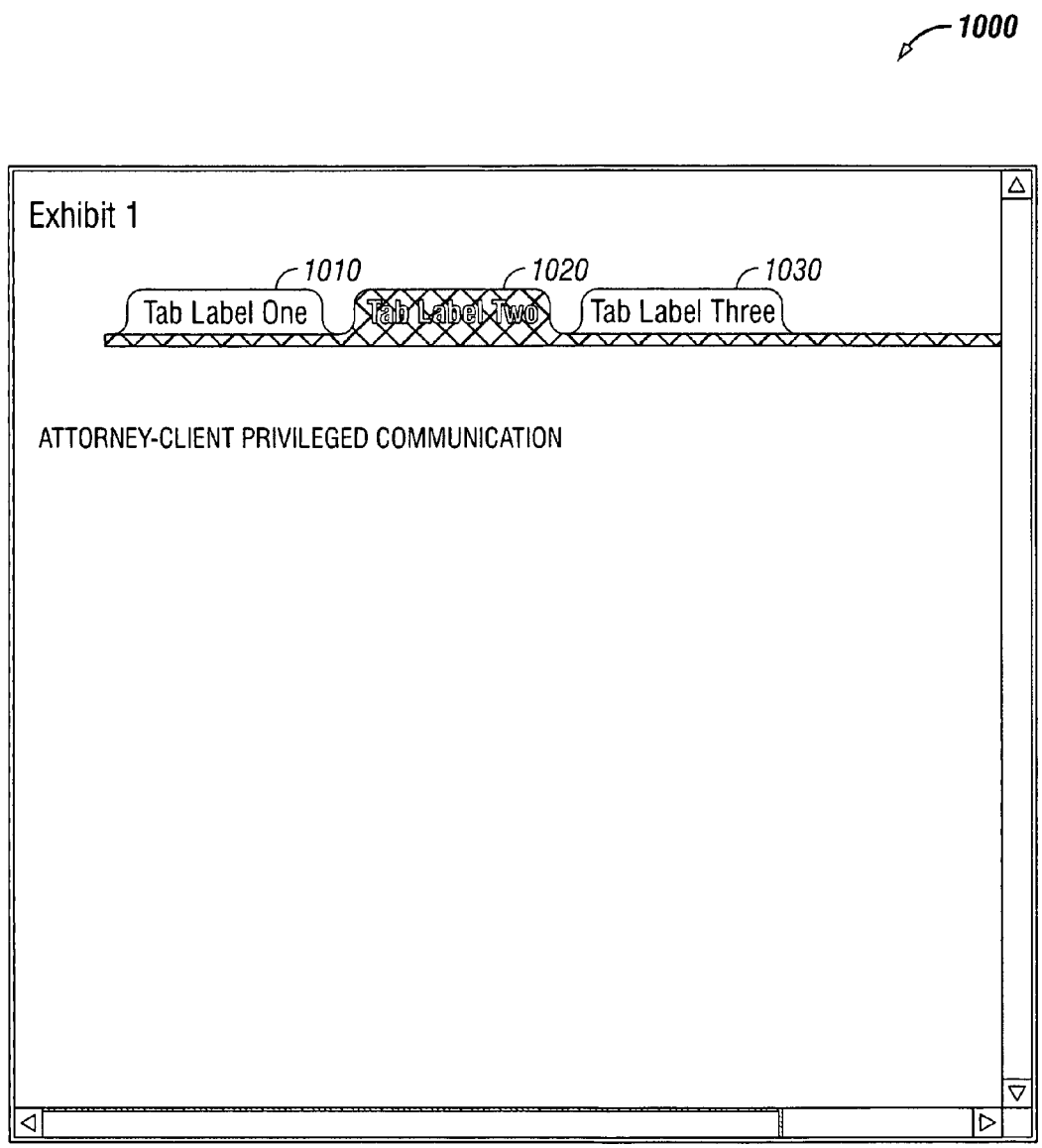
FIG. 10A is a diagram of a web page illustrating tab components with word wrapping capability, in accordance with one embodiment of the present invention.

FIG. 10A is a diagram illustrating the use of tab components comprised of HTML tables and graphical images to define the outline of the tab component. The tab components in FIG. 10A are presented over a white background on a display showing a window 1000 that has multiple tab components. As discussed previously, various color backgrounds are envisioned to be supported with embodiments of the present invention.

A single table (e.g., table 900) is comprised of three tab components 1010, 1020, and 1030. Tab component 1010 contains text that is a label, "Tab Label One;" tab component 1020 contains text that is a label, "Tab Label Two;" and tab component 1030 contains text that is a label, "Tab Label Three." The text within the tab components have a particular font and size of font that is consistent. The tab components 1010, 1020, and 1030 are presented in a single table for horizontal and vertical alignment.

Figure 10B:
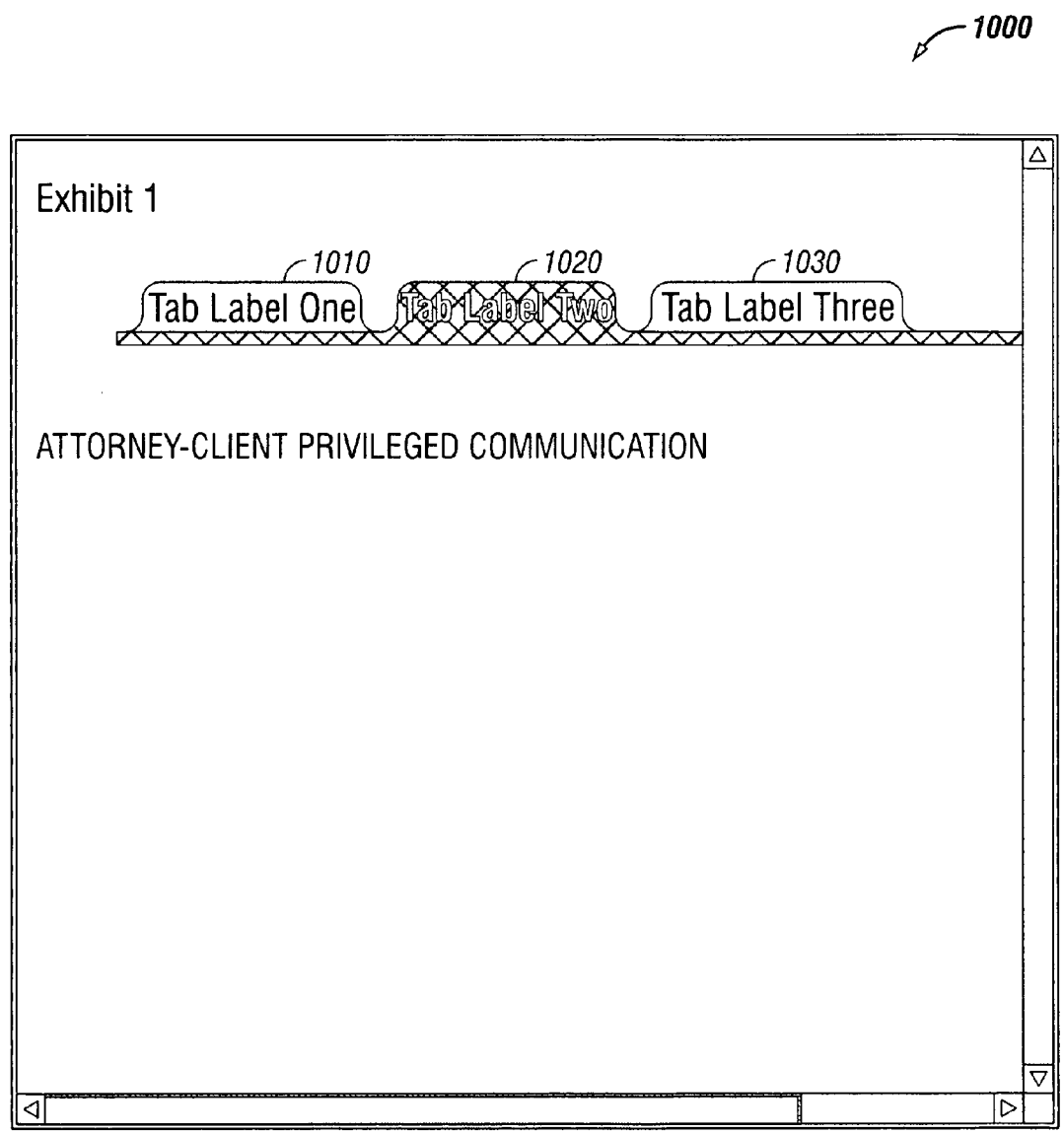
FIG. 10B is a diagram of the web page in FIG. 10A illustrating an increase in the font size of text within the web page and the corresponding horizontal and vertical alignment of tabs within the web page, in accordance with one embodiment of the present invention.

FIG. 10B illustrates the same window 1000 that has increased its font size through user preferences. As shown in FIG. 10B, alignment of the labels with other content within the window 1000 has been maintained. In addition, the tab components have increased in size to accommodate for the increased font sizing of the text within the tab component. As such, each of the tab components have been increased in both the horizontal and vertical directions. Moreover, alignment between all the tab components 1010, 1020, and 1030 is also maintained, by virtue of using HTML table based tab components.

Figure 10C:
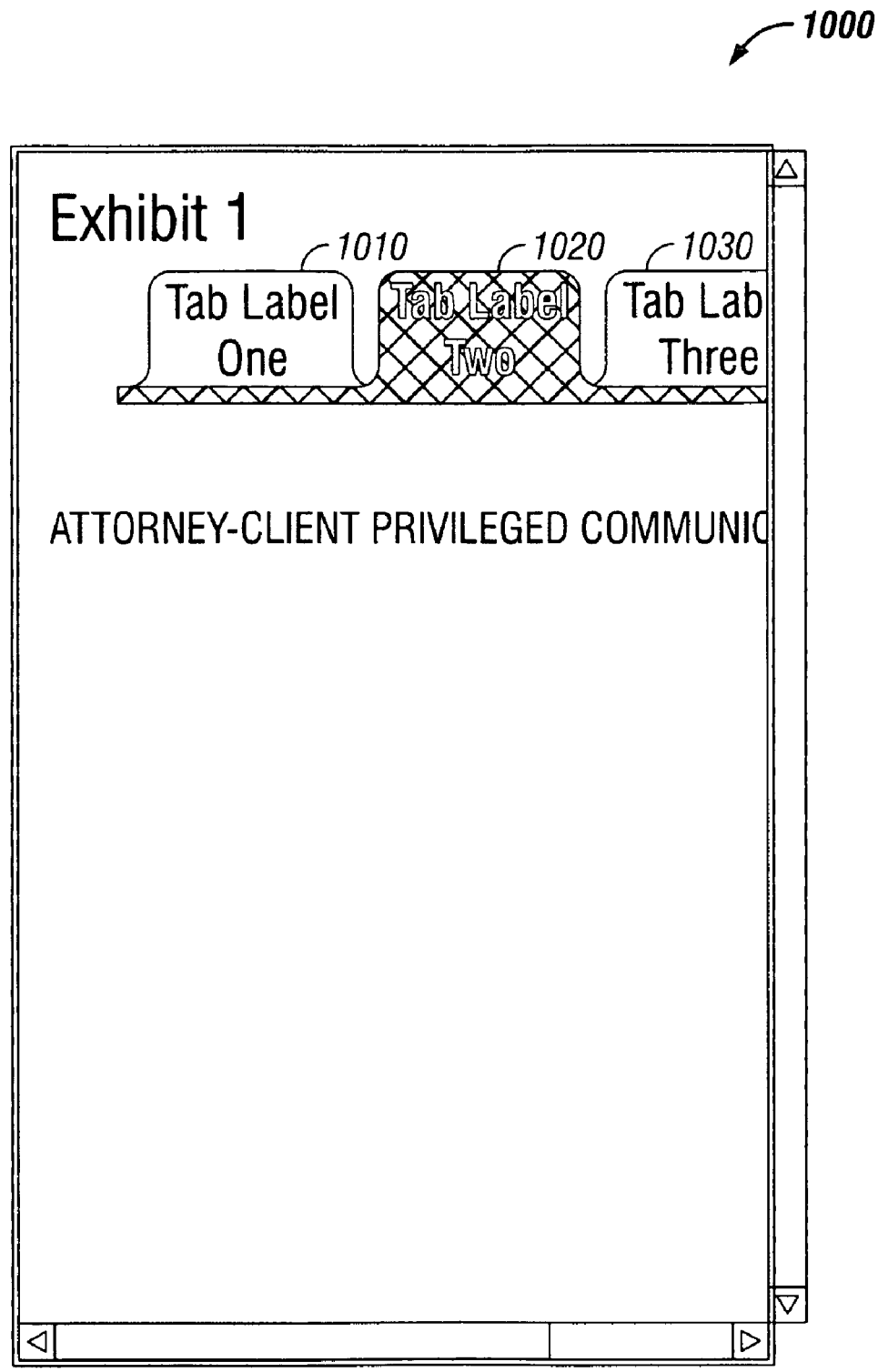
FIG. 10C is a diagram of the web page in FIG. 10A illustrating the horizontal shrinking of the web page and the corresponding word wrapping capability of the tab components, in accordance with one embodiment of the present invention.
Figure 11A:
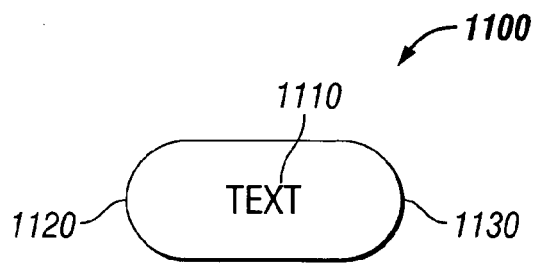
FIG. 11A is a diagram of a display button for a web page integrating both a graphic pictorial image with character based textual information (with link) into a single iconic button.
Figure 11B:
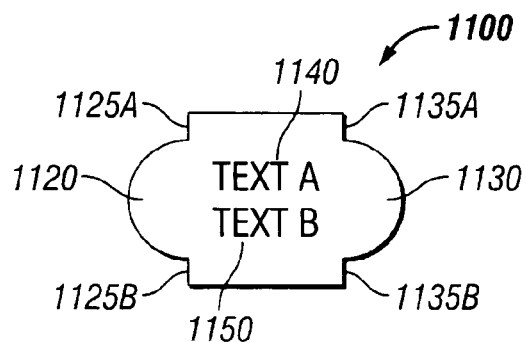
FIG. 11B is a diagram of the display button in Prior Art FIG. 11A that has expanded in the vertical direction without a corresponding expansion in the graphic pictorial image.

FIG. 10C illustrates the same window 1000 in a viewing window that has been reduced in the horizontal direction. In addition, the font size of the text within the tab components in the window 1000 has been increased from the font sizes previously selected in FIGS. 10A and B. Tab components will increase in size to accommodate the larger font size of the text within the tab components.

Furthermore, the tab components 1010, 1020, and 1030 will be aligned vertically to accommodate for the reduction in size of the window 1000. As such, the text within the tab components 1010, 1020, and 1030 will word wrap within their respective tab components. As such, the table containing the tab components 1010, 1020, and 1030 will adapt to fit within the window 1000 that has been reduced in the horizontal direction.

While the methods of embodiments illustrated in flow charts 300 and 700 show specific sequences and quantity of steps, the present invention is suitable to alternative embodiments. For example, additional steps can be added to the steps presented in the present embodiment. Likewise, the sequences of steps can be modified depending upon the application. Likewise, the sequence can be varied, and the symbols and encodings of the various parts of a name can be varied.

Embodiments of the present invention, a method and system for a user interface control component comprised of an HTML table and graphical images for defining the corner outlines of button and tab components, is thus described. While the present invention has been described in particular embodiments, it should be appreciated that the present invention should not be construed as limited by such embodiments, but rather construed according to the below claims.

What is claimed is:

1. A user interface comprising:
a hypertext markup language (HTML) based web page for display on a computer display and comprising a tab component, said tab component comprising:
a one row by five column table comprising a middle cell, a left tail cell, a left corner cell to the right of said left tail cell, a right corner cell to the right of said middle cell, and a right tail cell to the right of said right corner cell;
two graphical corner images placed in said left and right corner cells to effect a rounded top corner appearance in said tab component wherein said two graphical corner images are aligned to tops of said left and right corner cells, and comprise a rectangle comprising a curve whose middle is rounded away from a perceived interior of said tab component, said curve separating a first part outside said perceived interior and a second part inside said perceived interior; and
two tail graphical images placed in said two tail cells to effect a tailed bottom corner appearance in said tab component.

2. The user interface as described in claim 1, wherein said middle cell comprises a word wrapping capability to word wrap text contained within said middle cell, and said one row by five column table stretching in height to accommodate said word wrapping capability.

3. The user interface as described in claim 1, wherein said middle cell comprises text that when selected invokes a hyperlink.

4. The user interface as described in claim 1, wherein said first part is enabled to display a first color associated with said HTML web page, and said second part is enabled to display a second color associated with said tab component.

5. The user interface as described in claim 1, wherein said two tail graphical images are aligned to bottoms of said left and right tail cells, and comprise:
a rectangle comprising a curve separating a tail shaped part included within a perceived interior of said tab component and a second part outside of said perceived interior, said tail shaped part comprising a side touching said perceived interior and tailing away from said perceived interior to a corner of said tab component, said tail shaped part enabled to display a first color associated with said tab component, and said second part enabled to display a second color associated with said HTML web page.

6. The user interface as described in claim 1, further comprising:
a one row by 5×N column table of cells comprising N tab components each comprising five columns similarly constructed as said one row by 5 column table, and wherein all of said N tab components are aligned in height.

7. The user interface as described in claim 1, wherein said one row by five column table does not contain a border, and does not contain spacing between cells.

8. The user interface as described in claim 1, wherein said tab component further comprises:
an additional column to incorporate an icon within said one row by five column table.

9. A method of rendering a user interface comprising:
a) displaying a hypertext markup language (HTML) based web page on a computer display;
b) within said HTML based web page, displaying a tab component, said b) comprising:

b1) generating an HTML table of cells comprising a plurality of cells; and b2) placing a plurality of graphical corner images in said plurality of cells to produce corner outlines of said tab component;

generating a one row by five column table comprising a left tail cell, a left corner cell to the right of said left tail cell, a middle cell to the right of said left corner cell, a right corner cell to the right of said middle cell, and a right tail cell to the right of said right corner cell;

placing two graphical corner images in said left and right corner cells to effect a rounded top corner appearance in said tab component; and placing two graphical tail images in said two tail cells to effect a tailed bottom corner appearance in said tab component.

10. The method as described in claim 9, further comprising:

c) word wrapping text contained within said middle cell, said one row by five column table stretching in height to accommodate said word wrapping in c); and d) aligning said left and right tail cells, and said left and right corner cells to accommodate said word wrapping in said c).

11. The method as described in claim 10, further comprising:

d) invoking a hyperlink when said text is selected.

12. The method as described in claim 9, further comprising:

aligning said two graphical corner images to tops of said left and right corner cells;

enabling a first color associated with said tab component to be displayed in a first part of at least one of said two graphical corner images; and enabling a second color associated with said HTML based web page to be displayed in a second part of said one of said two graphical corner images, wherein a curve separates said first part that is within a perceived interior of said button component, and said second part that is outside said perceived interior in a rectangle of said one of said graphical corner images.

13. The method as described in claim 9, further comprising:

aligning said two graphical tail images to bottoms of said left and right tail cells, said graphical tail images comprising a curve separating a tail shaped part included within a perceived interior of said tab component and a second part outside of said perceived interior, said tail shaped part comprising a side touching said perceived interior and tailing away from said interior to a corner of said tab component;

enabling a first color of said tab component to be displayed in said tail shaped part; and enabling a second color of said HTML web page to be displayed in said second part.

14. A computer system comprising:

a processor; and a computer readable memory coupled to said processor and containing program instructions that, when executed, implement a method of rendering a user interface comprising:

c) displaying a hypertext markup language (HTML) based web page on a computer display;

d) within said HTML based web page, displaying a tab component, said b) comprising:

b1) generating an HTML table of cells comprising a plurality of cells; and b2) placing a plurality of graphical corner images in said plurality of cells to produce corner outlines of said tab component;

generating a one row by five column table comprising a left tail cell, a left corner cell to the right of said left tail cell, a middle cell to the right of said left corner cell, a right corner cell to the right of said middle cell, and a right tail cell to the right of said right corner cell;

placing two graphical corner images in said left and right corner cells to effect a rounded top corner appearance in said tab component; and placing two graphical tail images in said two tail cells to effect a tailed bottom corner appearance in said tab component.

15. The computer system as described in claim 14, wherein said method further comprises:

c) word wrapping text contained within said middle cell, said one row by five column table stretching in height to accommodate said word wrapping in c); and d) aligning said left and right tail cells, and said left and right corner cells to accommodate said word wrapping in said c).

16. The computer system as described in claim 15, wherein said method further comprises:

d) invoking a hyperlink when said text is selected.

17. The computer system as described in claim 14, wherein said method further comprises:

aligning said two graphical corner images to tops of said left and right corner cells;

enabling a first color associated with said tab component to be displayed in a first part of at least one of said two graphical corner images; and enabling a second color associated with said HTML based web page to be displayed in a second part of said one of said two graphical corner images, wherein a curve separates said first part, comprises within a perceived interior of said button component, and said second part that is outside said perceived interior in a rectangle of said one of said graphical corner images.

18. The computer system as described in claim 14, wherein said method further comprises:

aligning said two graphical tail images to bottoms of said left and right tail cells, said graphical tail images comprising a curve separating a tail shaped part included within a perceived interior of said tab component and a second part outside of said perceived interior, said tail shaped part comprising a side touching said perceived interior and tailing away from said interior to a corner of said tab component;

enabling a first color associated with said tab component to be displayed in said tail shaped part; and enabling a second color associated with said HTML web page to be displayed in said second part.

* * * * *